United States Patent
Murakami

(10) Patent No.: US 6,536,689 B2
(45) Date of Patent: Mar. 25, 2003

(54) MULBERRY LEAVES POWDER MANUFACTURING METHOD

(75) Inventor: Shinichi Murakami, Tochigiken (JP)

(73) Assignee: Minato Seiyaku Kabushikikaisha, Tokyo (JP)

( * ) Notice: Subject to any disclaimer, the term of this patent is extended or adjusted under 35 U.S.C. 154(b) by 23 days.

(21) Appl. No.: 09/960,362

(22) Filed: Sep. 24, 2001

(65) Prior Publication Data

US 2002/0056769 A1 May 16, 2002

(30) Foreign Application Priority Data

Sep. 22, 2000 (JP) ........................................ 2000-288114

(51) Int. Cl.⁷ ........................... A23L 1/272; B02C 19/12
(52) U.S. Cl. ............................. 241/18; 241/23; 241/25; 426/510; 426/518
(58) Field of Search ................................. 426/510, 511, 426/518, 509; 241/18, 25, 21, 23

(56) References Cited

U.S. PATENT DOCUMENTS 6,376,002 B1 * 4/2002 Ryu et al. ................... 426/565

* cited by examiner

Primary Examiner—Mark Rosenbaum
(74) Attorney, Agent, or Firm—Jacobson Holman PLLC

(57) ABSTRACT

Mulberry leaves washed in a washing water are soaked in a soaking liquid containing sodium bicarbonate and salt, then the leaves soaked in the soaking liquid are put into a steam blanching machine to blanch them with steam, the leaves steam blanched are put into a drying machine to dry them, the dried leaves are charged to a pulverizing machine pulverizing the leaves and obtaining mulberry leaves powder.

4 Claims, No Drawings

MULBERRY LEAVES POWDER MANUFACTURING METHOD

BACKGROUND OF THE INVENTION

1. Field of the Invention

The invention relates to a mulberry leaves powder manufacturing method, in which the effective component in the mulberry leaves doesn't escape and the mulberry leaves powder keeps its clear green color and the clear green colored powder is used for cooking and drinking.

2. Description of the Prior Art

Nowadays, one of the conventional method for pulverizing mulberry leaves, which has been well known, is that the mulberry leaves in fresh condition are dried or they are blanched with hot water and dried, then they are pulverized resulting in a powder condition. According to the conventional method, green color of the fresh mulberry leaves disappears and effective components contained in the mulberry leaves such as ascorbic acid, rutin, and isoquercitrin, etc are reduced since the mulberry leaves are blanched with hot water.

SUMMARY OF THE INVENTION

The invention has been invented to solve such shortcomings of the prior art. According to the mulberry leaves powder manufacturing method of the invention, mulberry leaves are soaked in a soaking water containing sodium bicarbonate and salt, then the soaked mulberry leaves are blanched with steam. Consequently, the effective components of mulberry leaves are kept in the leaves and clear green color of mulberry leaves are kept in the powder of the leaves.

DESCRIPTION OF THE PREFERRED EMBODIMENT

The mulberry leaves powder manufacturing method of the invention comprises a mowing step, a selection step, a water washing step, a soaking step, a steam blanching step, a drying step, and a pulverizing step for mulberry leaves. Respective steps will be described in order of manufacturing mulberry leaves powder.

First, mulberry leaves of mulberry preferably cultivated in organic are cut down in the cut down or mowing step. It is permitted to pick only leaves of the mulberry and, however, it is preferable to cut down the mulberry trees with leaves thereon, then pick the leaves so as to prevent from deteriorating leaves. It is preferable to cut down the mulberry trees of height: about 1:0 meter.

Next step is a selection one for the leaves of mulberry trees cut down in the previous step. The selection step for mulberry leaves is carried out on the leaves on the mulberry trees or only the leaves left from trees in order to remove such foreign matters or substances as dead leaves and dead blanches from leaves.

After the selection step for the leaves, a washing step is done on selected leaves. In this washing step, mud and dirty attached to the leaves on mulberry trees or mulberry leaves proper selected in the previous selection step are washed out with water to remove.

Next, after the water washing step, the soaking step is done on the fresh leaves themselves or the leaves on mulberry trees. Preferably, a soaking solution to be added to the soaking water is manufactured with a ratio of sodium bicarbonate and salt in 1:1. The solution is added to a soaking water in a ratio of 0.01–1.0% and then mixed. The leaves on mulberry trees or mulberry leaves proper are put in the soaking water formed as described above. Thus, it is possible to dry mulberry leaves in the drying step keeping their clear color of green.

Then the steam blanching step for mulberry leaves on the mulberry trees or the mulberry leaves proper soaked in the previous soaking step is carried out. In this steam blanching step, the mulberry leaves on the trees or mulberry leaves proper are thrown in a steam blanching machine and steam blanched at preferably a temperature of about 95–120 C for about 5(five) minutes. The steam blanching process for mulberry leaves makes the effective components contained in the leaves kept in the leaves properly. The effective components or substances have been removed when mulberry leaves are blanched with hot water according to the conventional way. Furthermore, the steam blanching process of the invention removes ferment contained in mulberry leaves and accordingly prevents the leaves from browning keeping their clear and bright green color. Also, the steam blanching step of the invention prevents harmful pheophorbide from being produced in mulberry leaves processed.

According to the invention, after the steam blanching step, the mulberry leaves on mulberry trees or mulberry leaves proper are sent to the drying step. In this drying step, the mulberry leaves with trees or mulberry leaves proper are charged into a drying machine and dried at a temperature of preferably 80C. In case that mulberry leaves on trees are charged into the drying machine together with the trees, it is preferable to pick the mulberry leaves from the trees and remove the trees out of the machine when leaves are dried about 90%. In accordance with the practice of the mulberry leaves powder manufacturing method of the invention, the leaves are taken out of the drying machine after leaves are confirmed that their water content lowers less than 5%.

The dried leaves are then sent to the last pulverizing step of the invention. Leaves of bright green color can be obtained in the drying step since they have been processed in the soaking step and the steam blanching step of the invention.

In the pulverizing step, the mulberry leaves dried by the previous drying step is thrown in the pulverizing machine to pulverize the leaves obtaining a powder of mulberry leaves. Particular grain size of the powder of mulberry leaves is determined by particular type of the usage or application of the mulberry powder. It is preferably to pulverize the mulberry leaves to the size of about 75–300 $\mu$m. Last, the mulberry leaves pulverized in the pulverization step of the invention is sealed in a package container.

The table 1 and table 2 show the analyzed test results of the mulberry leaves obtained by the steps of the invention and of the mulberry leaves blanched with hot water according to the conventional process for producing mulberry leaves powder.

TABLE 1

| Analysis test items | Results |
| --- | --- |
| Moisture | 3.4 g/100 g |
| Protein | 19.2 g/100 g |
| Fat | 4.9 g/100 g |
| Ash | 12.1 g/100 g |
| Available carbohydrate | 19.3 g/100 g |
| Energy | 198 Kcal/100 g |
| Dietary fiber | 41.1 g/100 g |

TABLE 1-continued

| Analysis test items | Results |
| --- | --- |
| Sodium | 187 mg/100 g |
| Total carotene | 35.6 mg/100 g |
| Retinol potency (calculated from carotene) | 6.600 IU/100 g |
| Thiamine (Vitamin $B_1$) | 0.44 mg/100 g |
| Riboflavin (Vitamin $B_2$) | 1.43 mg/100 g |
| Total ascorbic acid (Total vitamin C) | 21 mg/100 g |
| Total Tocopherol (Vitamin E) | 74.2 mg/100 g |
| α-Tocopherol | 51.4 mg/100 g |
| β-Tocopherol | 3.6 mg/100 g |
| γ-Tocopherol | 14.3 mg/100 g |
| δ-Tocopherol | 4.9 mg/100 g |
| Total dietary fiber | 44.8 g/100 g |
| Water soluble dietary fiber | 6.6 g/100 g |
| Water insoluble dietary fiber | 38.2 g/100 g |
| Free γ-amino butyric acid | 38 mg/100 g |
| Superoxide erase activity | $2.6 \times 10^3$ unit/g |
| Rutin | 67 mg/100 g |
| Quercitrin | No detected |
| Isoquercitrin | 170 mg/100 g |
| Total chlorophyll | 450 mg/100 g |

TABLE 2

| Analysis test items | Results |
| --- | --- |
| Moisture | 3.4 g/100 g |
| Protein | 19.7 g/100 g |
| Fat | 4.3 g/100 g |
| Ash | 11.9 g/100 g |
| Available carbohydrate | 18.9 g/100 g |
| Energy | 193 Kcal/100 g |
| Dietary fiber | 41.8 g/100 g |
| Sodium | 410 mg/100 g |
| Total carotene | 35.0 mg/100 g |
| Retinol potency (calculated from carotene) | 6.467 IU/100 g |
| Thiamine (Vitamin $B_1$) | 0.36 mg/100 g |
| Riboflavin (Vitamin $B_2$) | 1.39 mg/100 g |
| Total ascorbic acid (Total vitamin C) | 10 mg/100 g |
| Total Tocopherol (Vitamin E) | 65.9 mg/100 g |
| α-Tocopherol | 45.6 mg/100 g |
| β-Tocopherol | 3.0 mg/100 g |
| γ-Tocopherol | 12.4 mg/100 g |
| δ-Tocopherol | 4.9 mg/100 g |
| Total dietary fiber | 46.0 g/100 g |
| Water soluble dietary fiber | 6.7 g/100 g |
| Water insoluble dietary fiber | 39.3 g/100 g |
| Free γ-amino butyric acid | 38 mg/100 g |
| Superoxide erase activity | $1.6 \times 10^3$ unit/g |
| Rutin | 21 mg/100 g |
| Quercitrin | No detected |
| Isoquercitrin | 46 mg/100 g |
| Total chlorophyll | 408 mg/100 g |

As apparent from the table 1 and table 2 showing the analysis test results, according to the mulberry leaves powder manufacturing method of the invention, there is little difference between the results volumes of main nutrition substances such as protein, lapid and sugar, and the total carotene and the total tocopherol, and, however, the content volumes of ascorbic acid, rutin, isoquercitrin of water soluble effective substances are about twice and three times of these shown in the table 2 describing the conventional mulberry leaves powder manufacturing method. Consequently, it is apparent that more volumes of the effective substances in mulberry leaves are kept therein when they are processed according to the invention than when processed according to the conventional one.

It is apparent from the above description that when mulberry leaves are soaked in a soaking liquid containing sodium bicarbonate and salt, and blanched with steam, not with hot water according to the prior art, effective substances of mulberry leaves are sustained therein. And by making ferment devitalized, fresh and clean green color of mulberry leaves are kept in the powder of them.

The powder of mulberry leaves obtained by the method of the invention has much volumes of in special ascorbic acid, rutin and isoquercitrin, so that it is possible to use in cooking as a healthy food and a healthy drink.

What is claimed is:

1. A mulberry leaves powder manufacturing method comprising a mowing step for mowing mulberry leaves, a selection step for removing foreign substances from the mulberry leaves mowed, a washing step for washing the mulberry leaves mowed and selected with washing water, a soaking step for soaking the mulberry leaves washed with soaking water, a steam blanching step for putting the mulberry leaves soaked in the previous soaking step into a steam blanching machine and steam blanching the mulberry leaves, a drying step for putting the mulberry steam blanched in the previous steam blanching step and drying the mulberry leaves, and a pulverization step for inputting the mulberry leaves dried in the previous drying step into a pulverizing machine to pulverize the mulberry leaves.

2. The mulberry leaves powder manufacturing method according to claim 1, wherein said soaking water has a ratio of 1:1 of sodium carbonate and salt, and it is added to water in ratio of 0.01–1.0%.

3. The mulberry leaves powder manufacturing method according to claim 1, wherein said steam blanching step is carried out for about 5 minutes at a temperature of 95–120 C.

4. The mulberry leaves powder manufacturing method according to claim 1, wherein a drying temperature of the drying machine is about 80C, and a water content in the mulberry leaves is less than 5%.

* * * * *